US011292730B2

(12) United States Patent
Mhadeshwar et al.

(10) Patent No.: US 11,292,730 B2
(45) Date of Patent: Apr. 5, 2022

(54) HYDRATES FOR WATER DESALINATION USING ISO-BUTANE ADDITIVE

(71) Applicant: ExxonMobil Research and Engineering Company, Annandale, NJ (US)

(72) Inventors: Ashish B. Mhadeshwar, Garnet Valley, PA (US); Brian K. Peterson, Fogelsville, PA (US); Matthew S. Mettler, Tomball, TX (US); Rustom M. Billimoria, Hellertown, PA (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 262 days.

(21) Appl. No.: 16/391,587

(22) Filed: Apr. 23, 2019

(65) Prior Publication Data
US 2019/0322544 A1 Oct. 24, 2019

Related U.S. Application Data

(60) Provisional application No. 62/661,795, filed on Apr. 24, 2018.

(51) Int. Cl.
*C02F 1/26* (2006.01)
*C02F 103/08* (2006.01)

(52) U.S. Cl.
CPC .......... *C02F 1/265* (2013.01); *C02F 2103/08* (2013.01); *C02F 2305/00* (2013.01)

(58) Field of Classification Search
CPC ..................................................... C02F 1/265
See application file for complete search history.

(56) References Cited

U.S. PATENT DOCUMENTS

| 2,410,583 A | 11/1946 | Hutchinson |
| 5,434,330 A | 7/1995 | Hnatow et al. |
| 6,028,234 A | 2/2000 | Heinemann et al. |
| 6,111,155 A | 8/2000 | Williams et al. |
| 6,158,239 A | 12/2000 | Max et al. |
| 6,797,039 B2 | 9/2004 | Spencer |
| 2002/0003111 A1 | 1/2002 | Max |

(Continued)

OTHER PUBLICATIONS

Aliev et al., "Method of Gas Hydrate Formation For Evaluation of Water Desalination", Russian Journal of Applied Chemistry, 2008, vol. 81, No. 4, pp. 588-591.

(Continued)

*Primary Examiner* — Peter Keyworth
(74) *Attorney, Agent, or Firm* — Robert A. Migliorini

(57) ABSTRACT

A method for desalinating a liquid, including: contacting, within a hydrate former reactor, a feed gas stream including iso-butane in an amount ranging from above zero mol % to about 3 mol % and liquid seawater or liquid wastewater including a dissolved salt, wherein a temperature and pressure within the hydrate former reactor is controlled so that the feed gas stream and the liquid seawater or liquid wastewater form a hydrate slurry; separating hydrate particles from the hydrate slurry; and decomposing the hydrate particles into its constituents of water and gas or gas mixture containing iso-butane, wherein the water has a concentration of the dissolved salt that is less than that of the liquid seawater or liquid wastewater.

6 Claims, 12 Drawing Sheets

(56) References Cited

U.S. PATENT DOCUMENTS

| | | | |
|---|---|---|---|
| 2005/0247640 A1 | 11/2005 | Max et al. | |
| 2012/0228237 A1* | 9/2012 | Ma | C02F 1/725 210/760 |
| 2013/0012751 A1 | 1/2013 | Turner et al. | |
| 2014/0158635 A1* | 6/2014 | Katyal | C02F 1/5209 210/742 |
| 2019/0039916 A1* | 2/2019 | Song | C10L 3/104 |

OTHER PUBLICATIONS

Atik et al., "Experimental and Theoretical Study on Gas Hydrate Phase Equilibria in Seawater", Journal of Chemical and Engineering Data, 2010, vol. 55, pp. 804-807.

Cha et al., "Increasing Gas Hydrate Formation Temperature for Desalination of High Salinity Produced Water with Secondary Guests", ACS Sustainable Chemistry and Engineering, 2013, vol. 1, pp. 1218-1224.

Chatti et al., "Benefits and Drawbacks of Clathrate Hydrates: A Review of Their Areas of Interest", Energy Conservation & Management, 2005, vol. 46, pp. 1333-1343.

Kim et al., "Highly Porous CO2 Hydrate Generation Aided by Silica Nanoparticles For Potential Secure Storage of CO2 and Desalination", Royal Society of Chemistry (RSC) Advances, 2017, vol. 7, pp. 9545-9550.

Park et al., A New Apparatus for Seawater Desalination by Gas Hydrate Process and Removal Characteristics of Dissolved Minerals (Na+,Mg2+,Ca2+, K+,B3+), Desalination, 2011, vol. 274, pp. 91-96.

Sabil et al., "A Review of Carbon Dioxide Hydrate Potential In Technological Applications", Journal of Applied Sciences, 2011, vol. 11 (21), pp. 3534-3540.

Song et al., "Hydrate-Based Heavy Metal Separation From Aqueous Solution", Nature Scientific Reports, 2016, vol. 6, pp. 1-8.

Lee et al., "Accurate Measurement of Phase Equilibria and Dissociation Enthalpies of HFC-134a Hydrates in The Presence of NaCl For Potential Application in Desalination" 2016, vol. 33 (4), pp. 1425-1430.

Van et al., Behavior of Cyclopentane Hydrates Formation and Dissociation in Pure Water and in the Presence of Sodium Chloride, International Conference on Integrated Petroleum Engineering, 2016, pp. 150-157.

McElreath, "Comparison of Hydraulic Fracturing Fluids Composition With Produced Formation Water Following Fracturing-Implications for Fate and Transport", Environmental Protective Agency, 2018.

Roucher et al., Hydrates of Iso-and Normal Butane and Thier Mixtures, Desalination, 1969, vol. 6, pp. 57-73.

Sloan, "Fundamental Principles and Applications of Natural Gas Hydrates", Nature, 2003, vol. 426, pp. 353-359.

Kang et al., Seawater Desalination by Gas Hydrate Process and Removal Characteristics of Dissolved Ions (Na+, K+, Mg2+, Ca2+, B3+, Cl-, SO42-), Desalination, 2014, vol. 353, pp. 84-90.

Bradshaw et al., "Clathrate Hydrates for Production of Potable Water", Materials Research Society Symposium Proceedings, 2006, vol. 930, pp. 1-6.

* cited by examiner

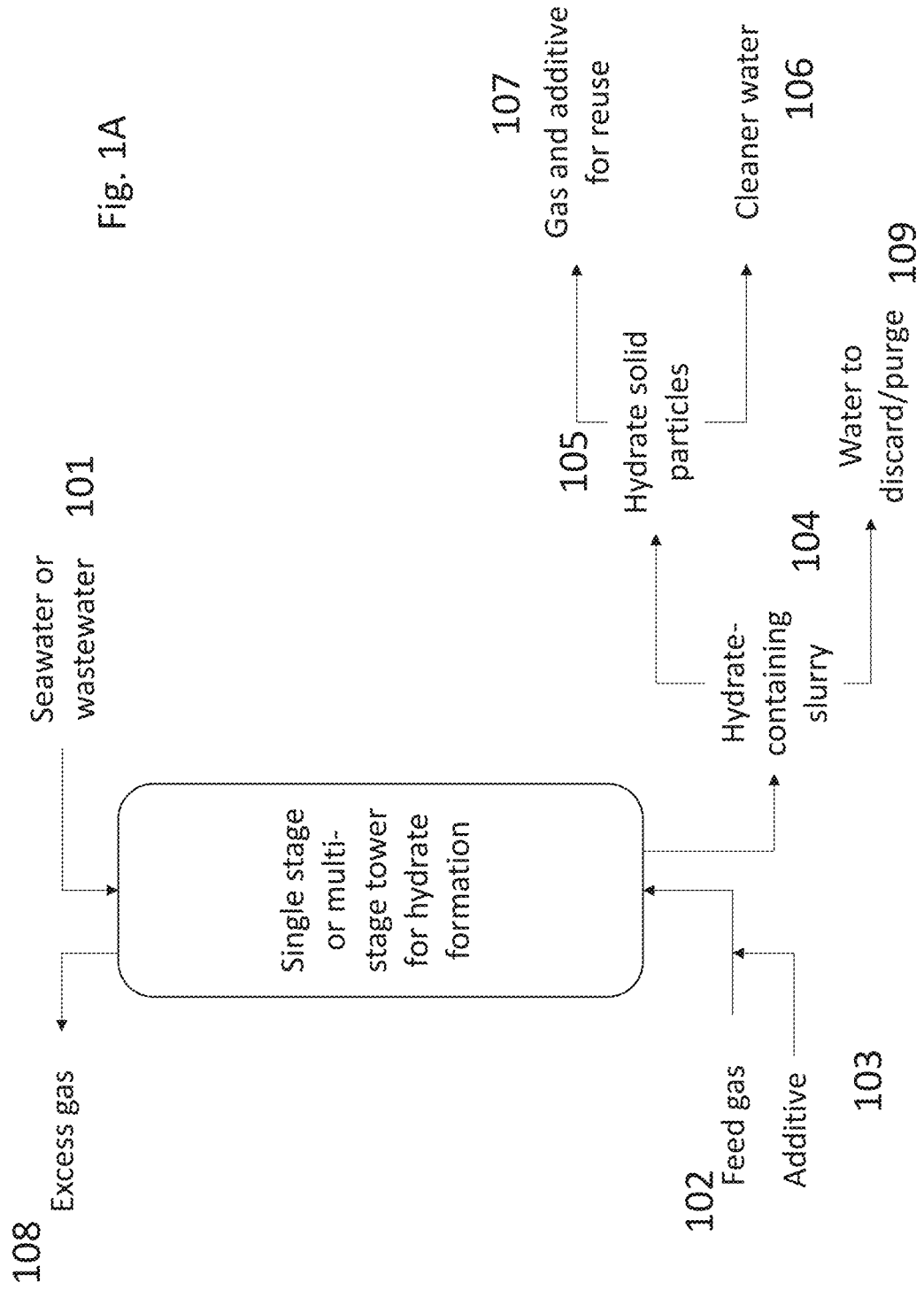

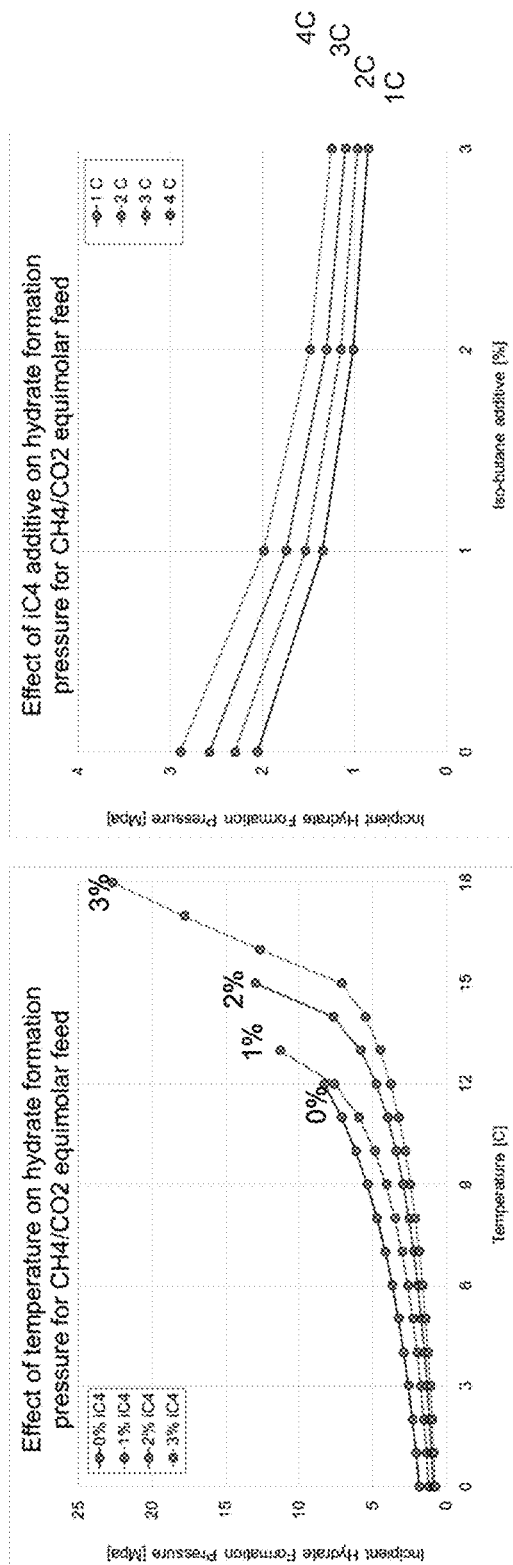

HYDRATES FOR WATER DESALINATION USING ISO-BUTANE ADDITIVE

CROSS REFERENCE TO RELATED APPLICATIONS

This application claims priority to U.S. Provisional Application Ser. No. 62/661,795 filed Apr. 24, 2018, which is herein incorporated by reference in its entirety.

TECHNOLOGICAL FIELD

Exemplary embodiments described herein pertain generally to desalination of seawater, wastewater, or other liquid including dissolved solids by using an additive including iso-butane to decrease a pressure needed for hydrate formation.

BACKGROUND

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

The current state of the art of desalination includes physical and chemical processes, such as adsorption, filtration, reverse osmosis, coagulation, flocculation, and chemical oxidation, or combinations of these for water purification [Seol-SustChemEng-2013].

Distillation and reverse osmosis (RO) are the current commercial technologies for water purification/desalination. Distillation is an expensive process due to high energy intensity. RO is membrane based and less expensive than distillation, but it suffers from fouling issues and it can only work with water feed with <5% Total Dissolved Solids (TDS). TDS is a measure of the combined content of all inorganic and organic substances contained in a liquid in molecular, ionized, or micro-granual (colloidal sol) suspended form.

A third approach based on hydrates has also been explored in the past. In the formation of a hydrate, a new stable structure is formed (under appropriate conditions) from two previously separated compounds, although no chemical bonds are changed. Water containing a salt can be brought in contact with a hydrate forming gas (e.g., $CH_4$, $CO_2$) at high pressure (P) and low temperature (T), which results in the formation of hydrates. Upon separation of the hydrate from the remaining liquid, the hydrates can be melted at lower P and/or higher T to extract relatively cleaner water. The fundamental driver for using hydrates for desalination is that during the process of hydrate formation, salt is rejected from the hydrate structure. Hydrates can also work with higher concentrations of TDS (~30%). However, due to the high P requirement, this approach has been considered uneconomical. Over the last few years, there has been a renewed interest in this process, because additives (e.g., CycloPentane, CycloHexane, $SF_6$, Propane, Hydrochlorofluorocarbon HCFC) can be introduced to decrease the P required for hydrate formation.

SUMMARY

A method for desalinating a liquid, including: contacting, within a hydrate former reactor, a feed gas stream including iso-butane in an amount ranging from above zero mol % to about 3 mol % and liquid seawater or liquid wastewater including a dissolved salt, wherein a temperature and pressure within the hydrate former reactor is controlled so that the feed gas stream and the liquid seawater or liquid wastewater form a hydrate slurry; separating hydrate particles from the hydrate slurry; decomposing the hydrate particles into its constituents of water and gas or gas mixture containing iso-butane, wherein the water has a concentration of the dissolved salt that is less than that of the liquid seawater or liquid wastewater.

In the method, the hydrate former reactor can be a multi-stage reactor.

In the method, the hydrate former reactor can be a single-stage reactor.

In the method, the hydrate former reactor can be a counter current flow reactor.

In the method, the hydrate former reactor can be a co-current flow reactor.

The method can further include recycling the iso-butane recovered from the decomposing step in the contacting step.

In the method, the feed gas stream can include $CO_2$, $CH_4$, or a combination thereof.

In the method, the hydrate former reactor can include one or more of a tower, pipe, tube, or tank.

A system for desalinating a liquid, including: a hydrate former reactor that contacts a feed gas stream including iso-butane in an amount ranging from above zero mol % to about 3 mol % and liquid seawater or liquid wastewater including a dissolved salt, wherein a temperature and pressure within the hydrate former reactor is controlled so that the feed gas stream and the liquid seawater or liquid wastewater form a hydrate slurry; and a hydrate decomposition unit that separates hydrate particles from the hydrate slurry and decomposes the hydrate particles into its constituents of water and gas or gas mixture containing iso-butane, wherein the water has a concentration of the dissolved salt that is less than that of the liquid seawater or liquid wastewater.

In the system, the hydrate former reactor can be a multi-stage reactor.

In the system, the hydrate former reactor can be a single-stage reactor.

In the system, the hydrate former reactor can be a counter current flow reactor.

In the system, the hydrate former reactor can be a co-current flow reactor.

In the system, the iso-butane recovered by the hydrate decomposition unit can be recycled and combined with the feed gas stream.

In the system, the feed gas stream can include $CO_2$, $CH_4$, or a combination thereof.

In the system, the hydrate former reactor can include one or more of a tower, pipe, tube, or tank.

BRIEF DESCRIPTION OF THE DRAWINGS

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles.

FIG. 1A illustrates an exemplary process embodying the present technological advancement.

FIG. 8A illustrates the effect of temperature on hydrate formation for $CH_4/CO_2$ equimolar feed with various concentrations of iso-butane additive.

FIG. 8B illustrates the effect of iso-butane additive on hydrate formation for $CH_4/CO_2$ equimolar feed at various temperatures.

DETAILED DESCRIPTION

Figure 1B:
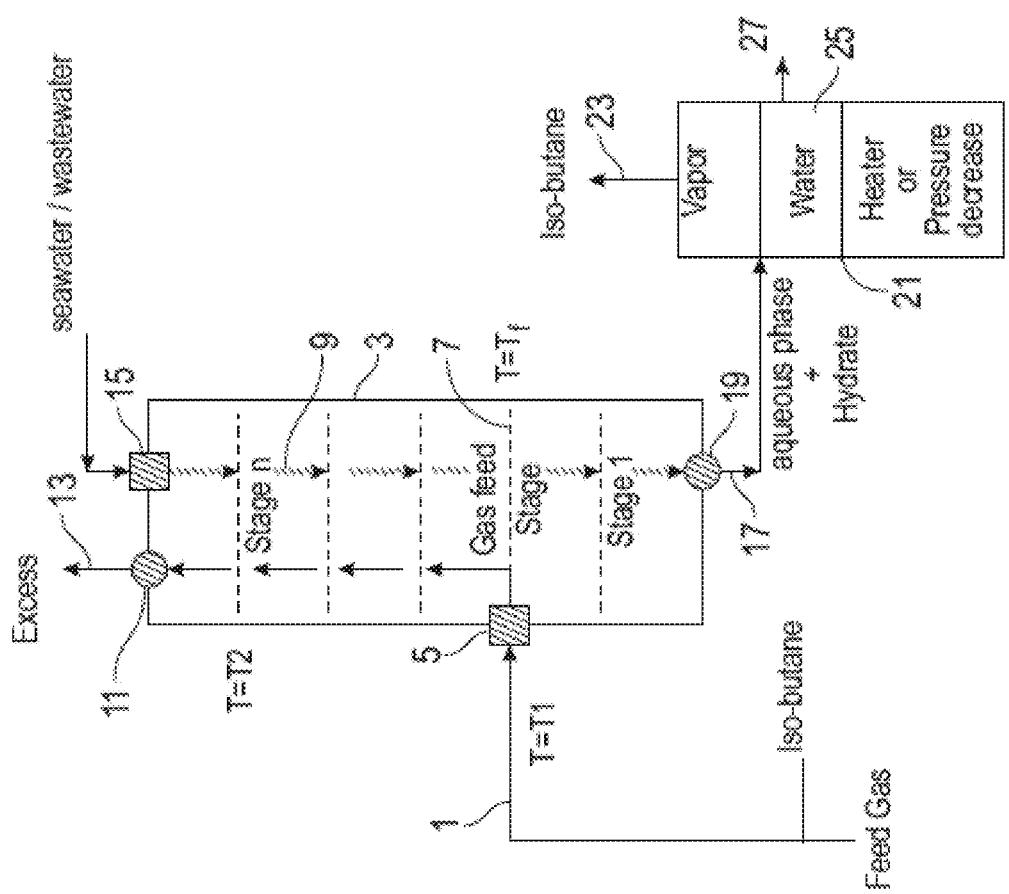
FIG. 1B illustrates an exemplary system embodying the present technological advancement.

Exemplary embodiments are described herein. However, to the extent that the following description is specific to a particular embodiment, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

The present technological advancement addresses the problem of seawater or wastewater desalination by using a new hydrate based separation processes. The present technological advancement can be used in (a) fresh water production, (b) gas conversion, and (c) fracking water cleanup.

Aspects of the present technological advancement have been computer simulated with a Grand Canonical Monte Carlo (GCMC) based generalized modeling approach that enables the exploration of interactions of various additive molecules with the hydrate structure. Molecular simulation in general, and GCMC in particular, are ways of solving the statistical mechanics estimation of the thermodynamics of all or portions of the guest molecule (additive)/hydrate problem. In this approach, only the interactions of the additive with a pre-formed hydrate are simulated. This is analogous to simulating the adsorption of a gas molecule in an adsorbent such as a zeolite. This process is routinely modeled with GCMC simulations and here we have used GCMC to simulate the "adsorption" of additives in the hydrate structure. The inputs to a GCMC simulation are the chemical potential or fugacity (approximately the pressure) of a gas phase and the structure of a solid phase. The outputs are the number of gas molecules adsorbed in the solid and other properties calculated from the energies of interaction of all the included atoms and molecules. Based on the simulations, a number of additives were identified that can decrease the P requirement compared to the traditional hydrate-forming constituent molecules (e.g., $CH_4$, $CO_2$, etc.). As used herein, a "hydrate-forming constituent" refers to a compound or molecule in a fluid, including natural gas, which forms hydrate at elevated pressures and/or reduced temperatures. Illustrative hydrate-forming constituents include hydrocarbons such as methane, ethane, propane, iso-butane, ethylene, propylene. Hydrate-forming constituents can also include non-hydrocarbons, such as hydrogen sulfide, carbon dioxide, sulfur dioxide, and/or nitrogen dioxide.

As used herein, the term "gas" is used interchangeably with "vapor," and means a substance or mixture of substances in the gaseous state as distinguished from the liquid or solid state. Likewise, the term "liquid" means a substance or mixture of substances in the liquid state as distinguished from the gas or solid state. As used herein, "fluid" is a generic term that may include either a gas or vapor. As used herein, "pressure" is the force exerted per unit area by the gas on walls enclosing a volume.

The following two additional constraints have also been applied in selecting a hydrate-forming constituent for some applications of the present technological advancement. (1) Since the additive gets incorporated in the hydrate structure, it will need downstream separation from water after melting the hydrate. Therefore, highly soluble gas additives and highly miscible liquid additives are eliminated from consideration for desalination. (2) Certain additives that are water-immiscible are also eliminated from consideration based on toxicity. After applying these constraints, it has been determined that iso-butane ($iC_4$) is an excellent additive for decreasing the pressure for hydrate formation, while maintaining ease of downstream separation from water (low solubility in water, relatively non-toxic). This finding is further confirmed via hydrates thermodynamics simulations that show the extent of P reduction (or T increase) for hydrate formation upon adding various amounts of $iC_4$ additive.

FIG. 1A illustrates an exemplary process embodying the present technological advancement. Here, seawater or wastewater 101 is brought in contact with a hydrate former gas 102 (e.g., NG, $CH_4$, $CO_2$, Biogas, Landfill gas, etc.). Most low molecular weight gases as well as some higher hydrocarbons and freons will form hydrates at suitable temperatures and pressures. Seawater means water taken from a sea or ocean, or water with an average salinity (3.1-3.8%) approximating that of seawater. Wastewater means water that has been used in a home, in a business, as part of an agricultural process, or as part of an industrial process. Iso-butane additive 103 can be added to the feed gas for reduction in pressure (or equivalently, higher temperature operation at a given pressure) for hydrate formation. In another embodiment, pure iso-butane could be used as the feed gas and reused. Moreover, the concentration of iso-butane can vary depending upon desired pressure and temperature operating conditions. Excess gas 108 can be rerouted for reuse.

Hydrate particles 105 can be separated from the hydrate slurry 104 and melted to extract/separate cleaner water 106, and hydrate former gas/the Iso-butane additive 107 for reuse. When all cavities are filled, hydrates typically have a molar composition of about 85% water and about 15% gas. The present technological advancement can generate up to about 5.7 moles of water per mole of gas. Any means (including but not limited to pressure filtration or decanting) can be used to separate the hydrates from the hydrate slurry that will permit the solid hydrate particles to be collected. Remnants 109 of the slurry 104 can be discarded or purged. Hydrate particles can include particles of sufficiently small size to remain suspended by flow of a slurry of the particles in the aqueous phase, and can also include aggregates of clathrate particles that have accreted to a size visible to the naked eye or larger, e.g. as to settle from a standing aqueous phase under the influence of gravity. Hydrates collected from disclosed processes and apparatus can be in solid form of substantial mass. As used herein, a "clathrate" is a weak composite made of a host compound that forms a basic framework and a guest compound that is held in the host framework by intermolecular interaction, such as hydrogen bonding, Van der Waals forces, and the like. Clathrates may also be called "host-guest complexes", "inclusion compounds", and "adducts". As used herein, "clathrate" and "hydrate" are interchangeable terms used to indicate a clathrate having a basic framework made from water as the host compound. A hydrate is a crystalline solid which looks like ice, and forms when water molecules form a cage-like structure around a "hydrate-forming constituent."

The hydrate-based desalination process can be carried out in a single stage or a multistage configuration, wherein one or more vessels are used in hydrate formation. The multistage configuration can be a counter-, cross-, or co-current tower, a counter- or co-current pipe or tube, or a series of stirred or unstirred tanks with gas, liquid water and suspended hydrate particles moving in counter- or co-current mode. Stages in a hydrate formation reactor are implemented by establishing a zone of controlled temperature at a particular section of a hydrate forming reactor. The multistage operation is particularly relevant if the desalination process is combined with gas separation (e.g., $CO_2$—$N_2$).

FIG. 1B illustrates an embodiment of a system for hydrate-based gas desalination with a hydrate forming reactor. A hydrate forming reactor can accomplish intimate mixing of the gas and aqueous phases in a countercurrent flow, and is considered to be generic for the examples of towers, pipes, tubes, and tanks discussed above. Apparatus and methods for mixing gases and aqueous phases are known, and include bubbling of gas through a column of the aqueous phase, venturi-type mixers, "bubble tray" or "liquid tray" arrangements within towers that are contacted with a flow of the liquid phase or with a flow of the gas phase, respectively, and distribution of the aqueous phase as a mist or fine droplets that are carried through the gas phase or fall through it under the influence of gravity. See, for example, U.S. Pat. Nos. 2,410,583, 5,434,330, 6,111,155, 6,028,234, 6,797,039 and US20130012751, all of which hereby incorporated by reference in their entirety.

The hydrate forming reactor can also include a series of stages, which are established by creating zones within the reactor that are controlled to a selected temperature by either refrigeration or heating as necessary. For example, in a reactor in which a flow of gas upward is contacted by a flow of aqueous phase as a falling mist, zones of defined temperature can be established by baffles perforated by riser tubes, each baffle being configured to carry a heat exchange fluid so as to control the temperature of the baffle and associated riser tubes to a selected temperature by heating or refrigeration of the heat exchange fluid. As another example, in a "tray" arrangement, the temperatures of each of the trays can be individually controlled.

A hydrate-forming constituent 1, combined with iso-butane 2 (together a "gas stream"), enters a hydrate formation reactor (HFR) 3 via a gas inlet 5 located at a gas feed stage 7. The gas feed stage is maintained at a temperature Tf. The gas stream in this example is brought in contact with a seawater or wastewater stream 9 and comes out at an excess gas outlet of the HFR 11. The excess gas 13 is stored, put to use (i.e., recycled) or vented to the atmosphere (although this is a less desirable option).

The seawater or wastewater stream enters the hydrate formation reactor 3 via an inlet 15 and exits the hydrate formation reactor as a hydrate slurry 17 via a hydrate slurry outlet 19. The aqueous phase hydrate slurry is transported to a hydrate decomposition facility 21 that includes both a hydrate decomposition unit (HDP) and a vapor-liquid separator (VLS). The hydrate is decomposed in the HDP into the component gas(es) and the aqueous phase (water or a water solution that is cleaner or contains less TDS relative to the input to HFR 11) by operation of a heater or by lowering the pressure under which the hydrate is maintained. The resulting gas(es) and aqueous phase are separated one from another in the VLS to obtain a gas 23, which is iso-butane and can be reused/recycled, and regenerated aqueous phase 25 (cleaner water). The regenerated aqueous phase leaves the VLS via an aqueous phase line 27.

Figure 2A:
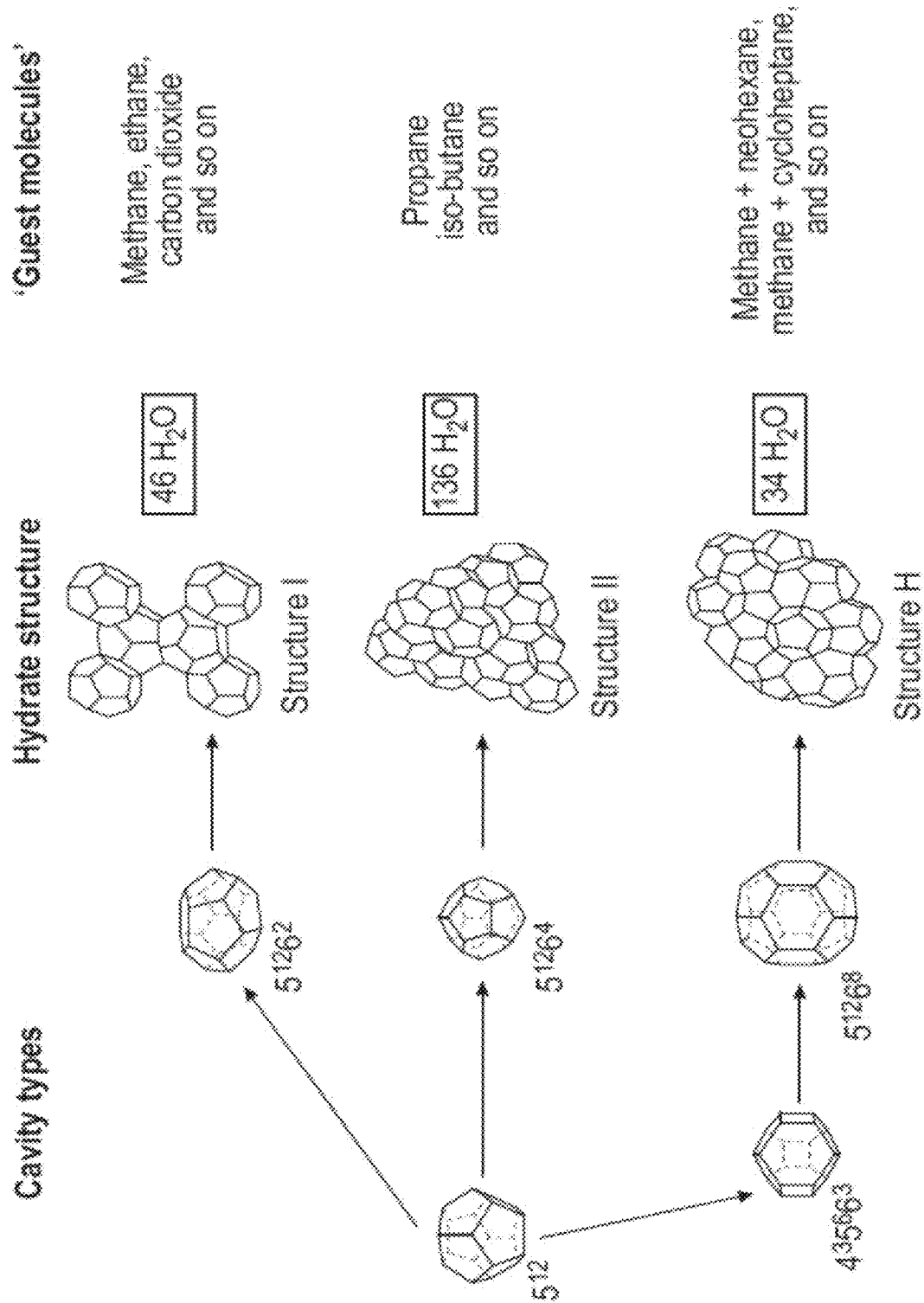
FIG. 2A illustrates different types of hydrate structures that can be formed [Sloan-Nature-2003].
Figure 2B:
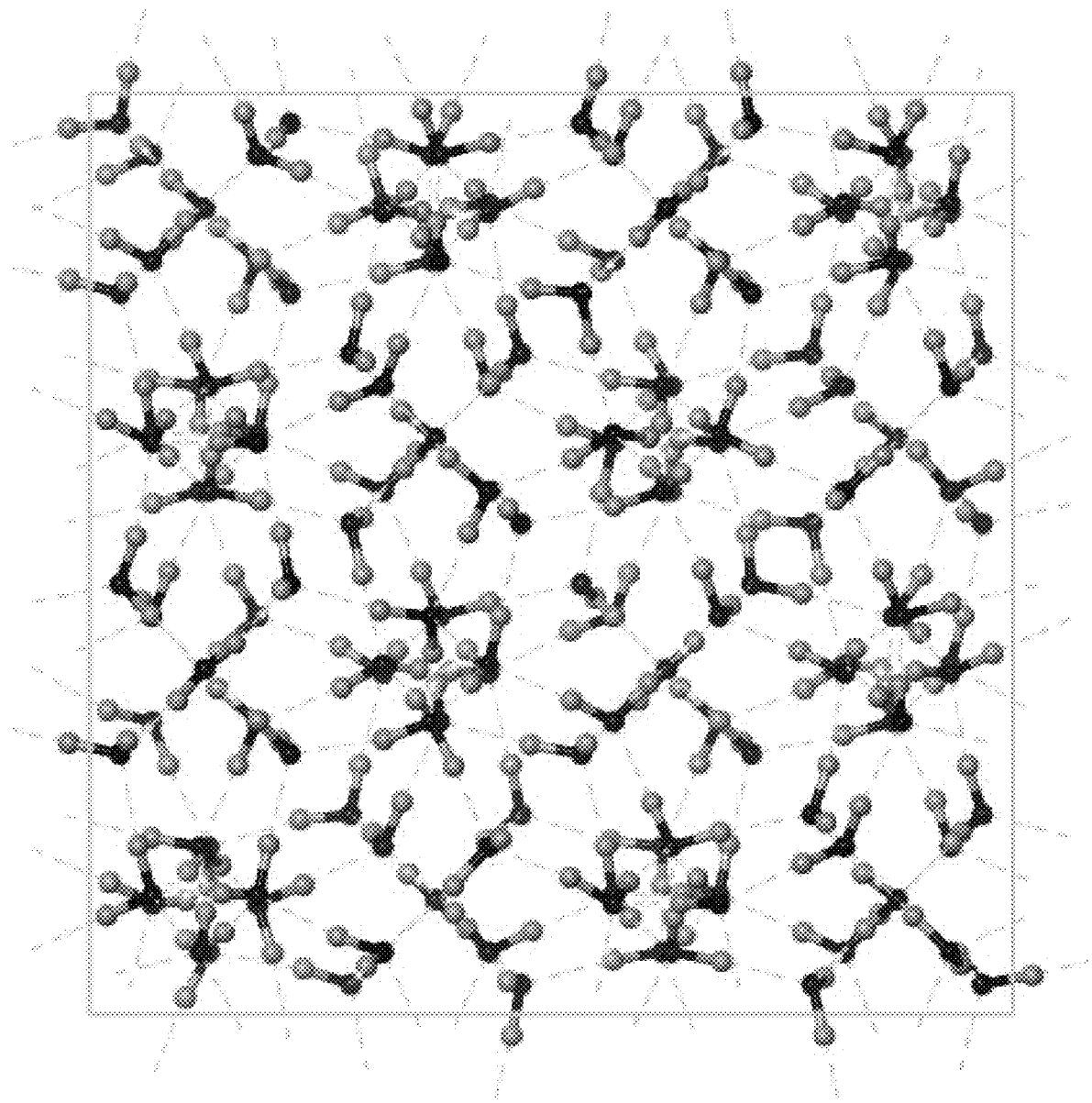
FIG. 2B illustrates the structure of sII hydrates from a first angle.
Figure 2C:
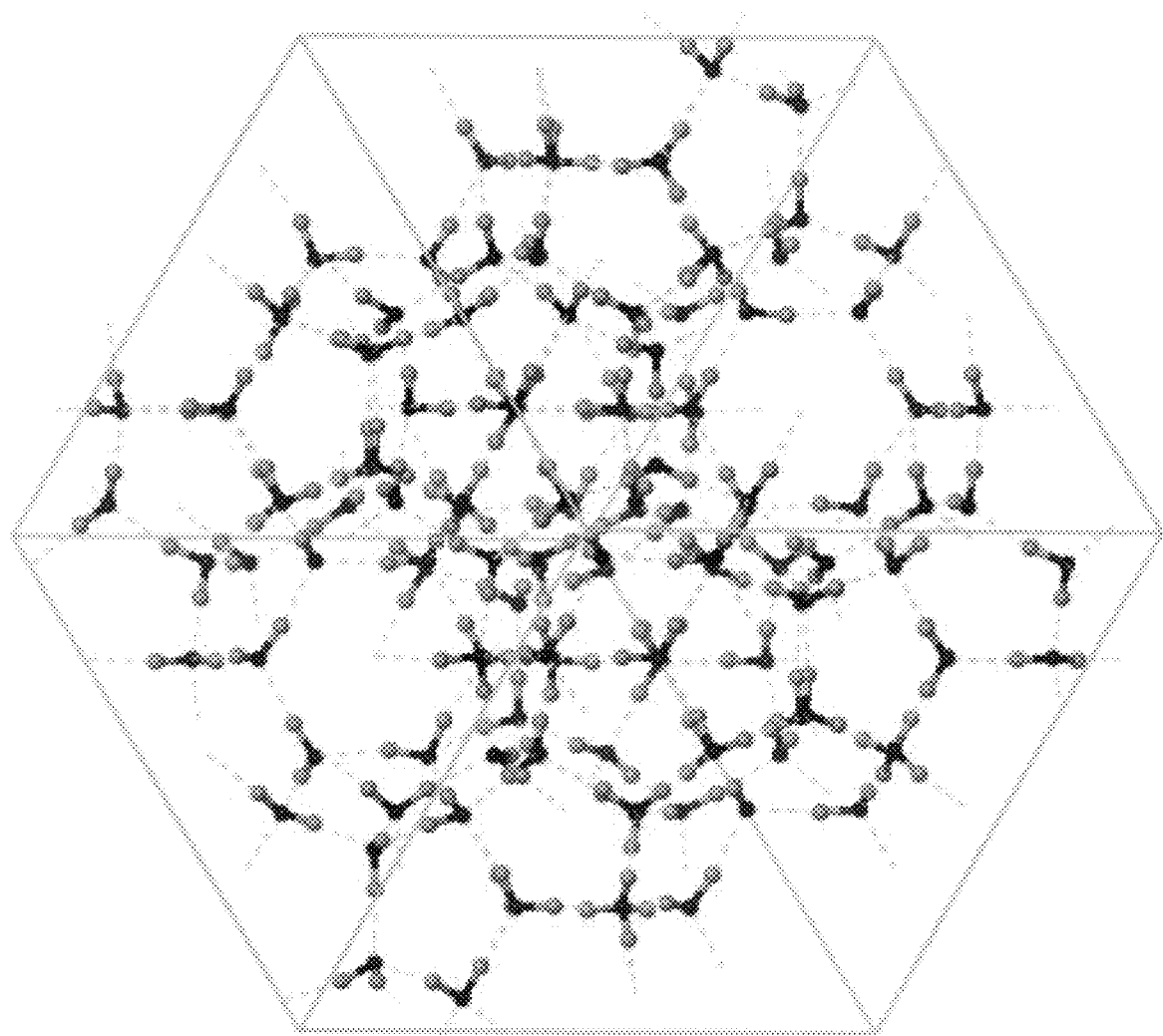
FIG. 2C illustrates the structure of sII hydrates from a second angle.

Hydrates are ice-like crystalline solids formed from water and gas molecules. They resemble wet snow. Water molecules form hydrogen-bond cages around the guest gas molecules. There is no chemical bond between water and gas molecules, only Van der Waals forces. Due to the repulsion among gas molecules, different types of hydrate structures are formed (FIG. 2A). Most common hydrate structures are sI and sII. sI hydrates are typically formed with small gas molecules such as Methane, Ethane, Carbon Dioxide, whereas sII hydrates are typically formed with larger gas molecules such as Propane, Iso-butane (FIGS. 2B and 2C, which illustrates the structure of sII hydrate from two angles). Hydrate structure is not strictly correlated with the size of the gas molecule. Mixtures of gases behave differently than pure gases, i.e., hydrate structure depends on the mixture gas composition. Hydrates have enormous potential to trap gas molecules. Gas concentration in the hydrate is comparable to that of a highly compressed gas (e.g., 180 vol/vol of gas/hydrate for methane). Hydrates are typically formed at high pressure and low temperature. They can be decomposed or melted at lower pressure and/or at higher temperature. When all cavities are filled, hydrates typically have a molar composition of ~85% water+~15% gas. Further information on hydrates can be found in Sloan-Nature-2003.

Figure 3:
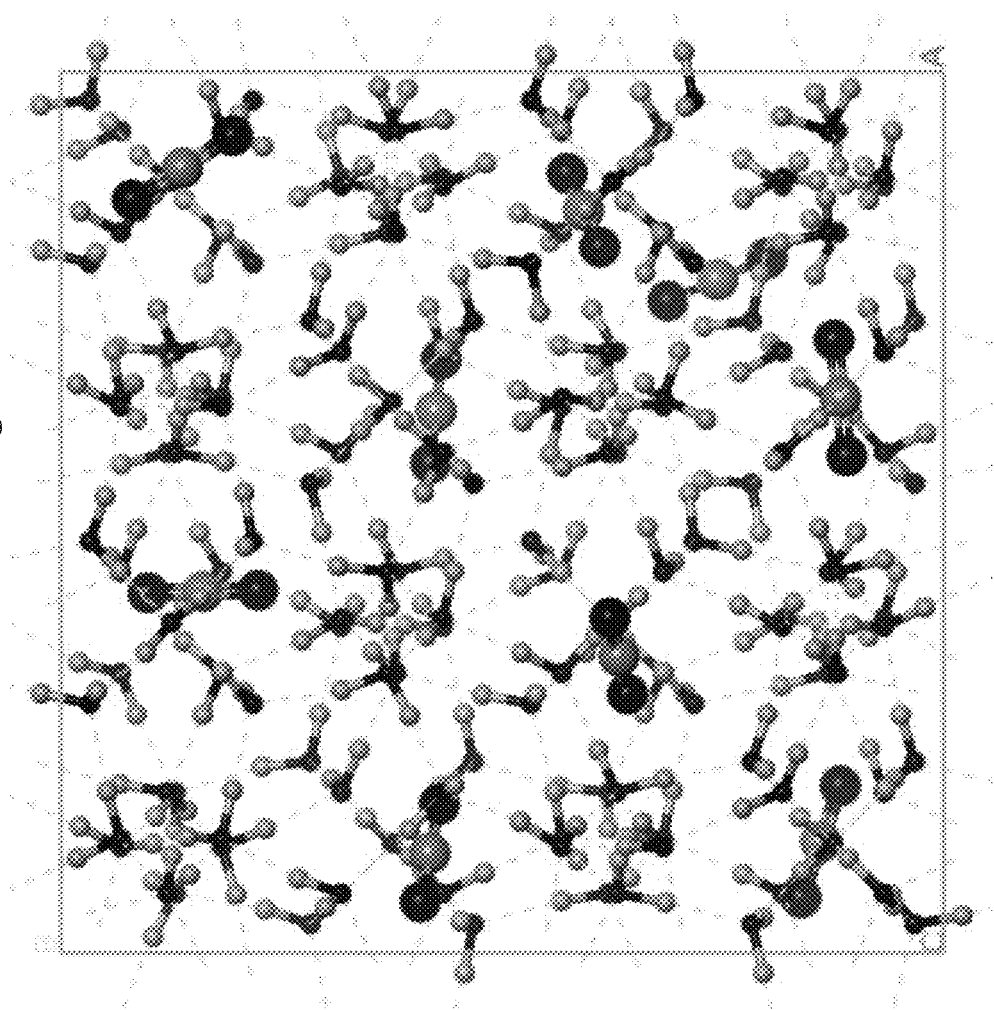
FIG. 3 illustrates sorption of $CO_2$ molecules in the sII hydrate structure at 5 bar and 1 C.
Figure 4:
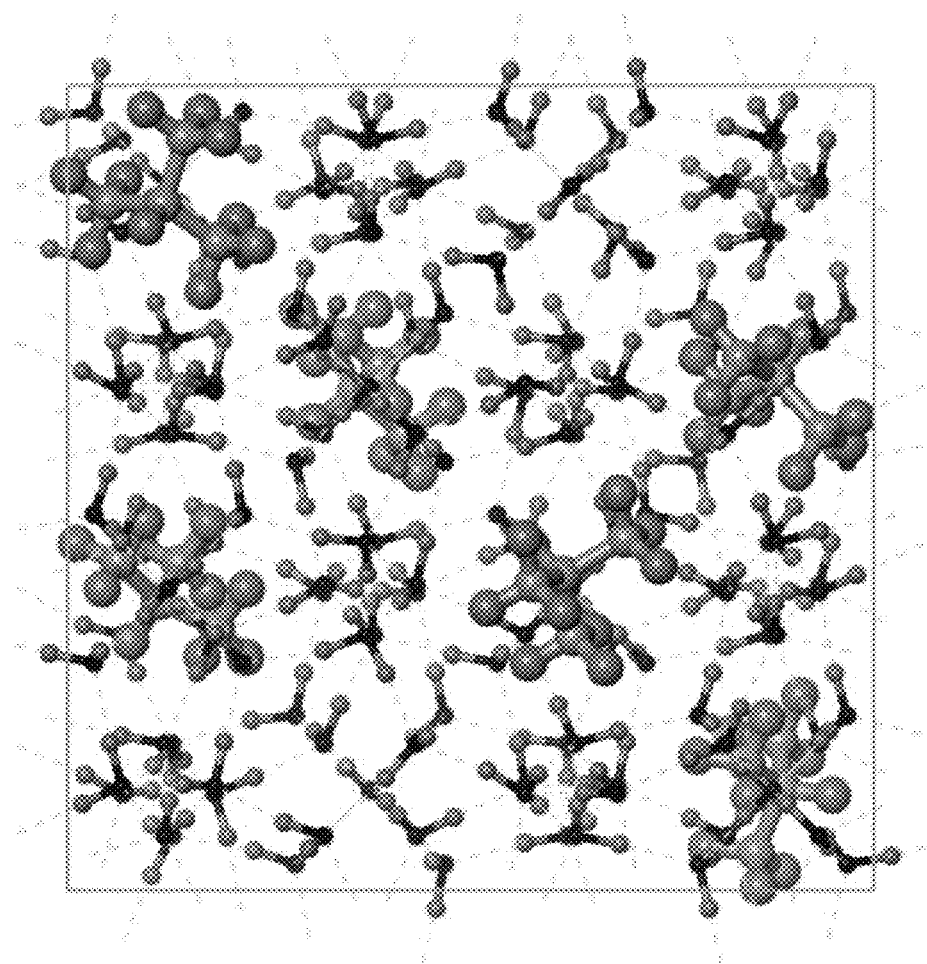
FIG. 4 illustrates sorption of iso-butane molecules in the sII hydrate structure at 5 bar and 1 C.

The fundamental driver for using hydrates for desalination is that during the process of hydrate formation, salt is rejected from the hydrate structure. Hydrates can also work with higher concentrations of TDS (~30%, but also including all values below 30%). However, due to the high pressure requirement, this approach has been considered uneconomical. Over the last few years, there has been a renewed interest in this process, because various additives (e.g., CycloPentane, CycloHexane, $SF_6$, Propane, Hydrochlorofluorocarbon HCFC, etc.) can be introduced to decrease the pressure required for hydrate formation [Ref: Seol-SustChemEng-2013, Lee-Desalination-2011, Lee-Desalination-2014, Song-Nature-2016]. Identification of such additives that result in pressure reduction is a fairly challenging task. GCMC simulations were carried out using the BIOVIA Materials Studio software, version 2016 available from Dassault Systemes. Conditions for simulation were: Pressure=5 bar, Temperature=1 C. sII hydrate structure was chosen for the simulations, since it is the most preferred structure upon addition of additives with hydrate formers. Molecules (such as, liquid water with additive molecules of methane, ethane, propane, isobutate, $CO_2$, $H_2S$, $SO_2$, $NO_2$, THF (tetrahydrofuran), Chloroform, Carbon tetracholoride, sulfuric acid, HF, etc.) were tested in the simulations and were forced to interact with the hydrate structure at these conditions to estimate the isosteric heat. FIGS. 3 and 4 show the sorption of two representative molecules ($CO_2$ and Iso-Butane, respectively) in the hydrate structure.

Figure 5:
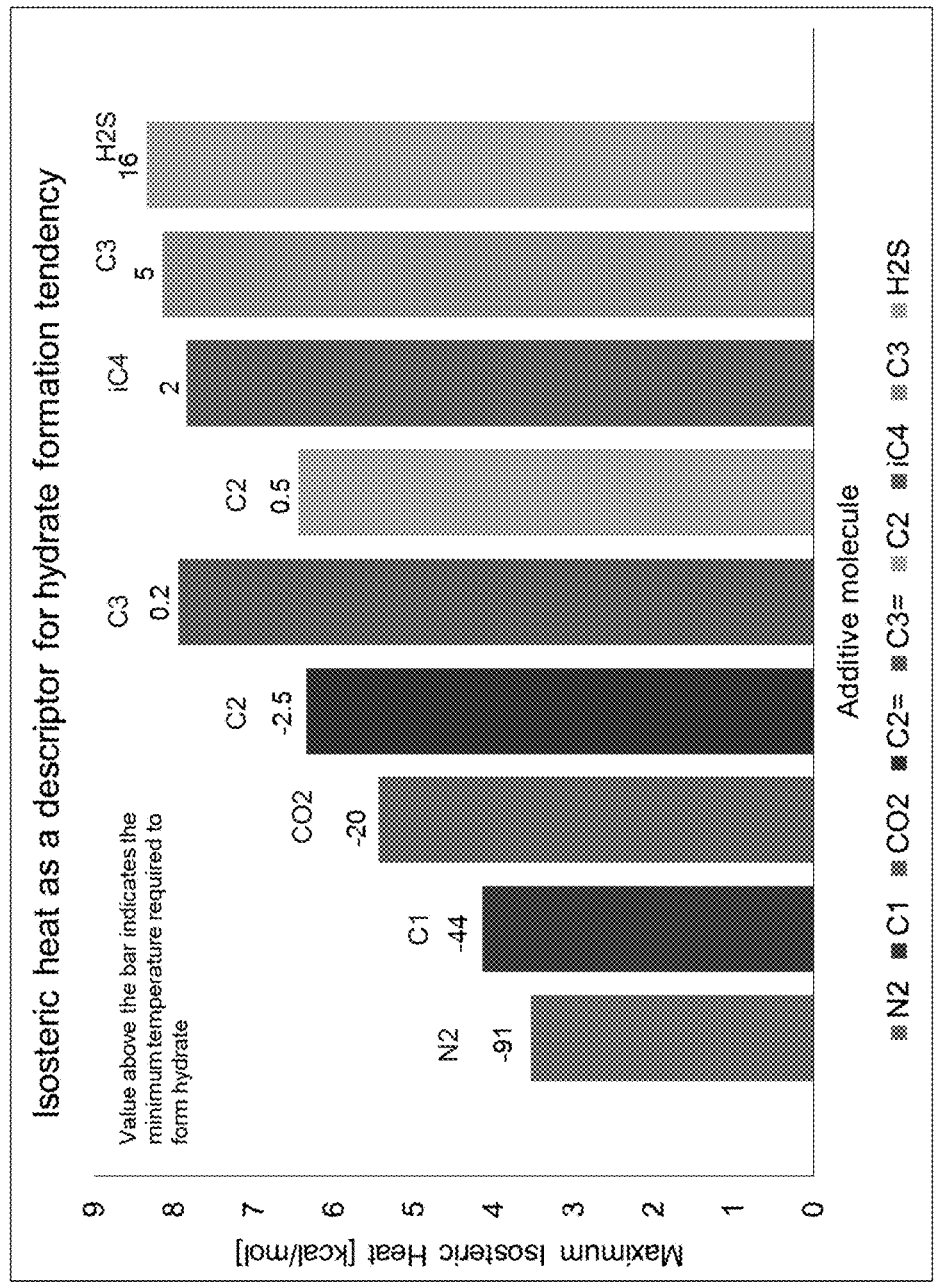
FIG. 5 illustrates isoteric heat as a descriptor for hydrate formation tendency.
Figures 6A, 6B:
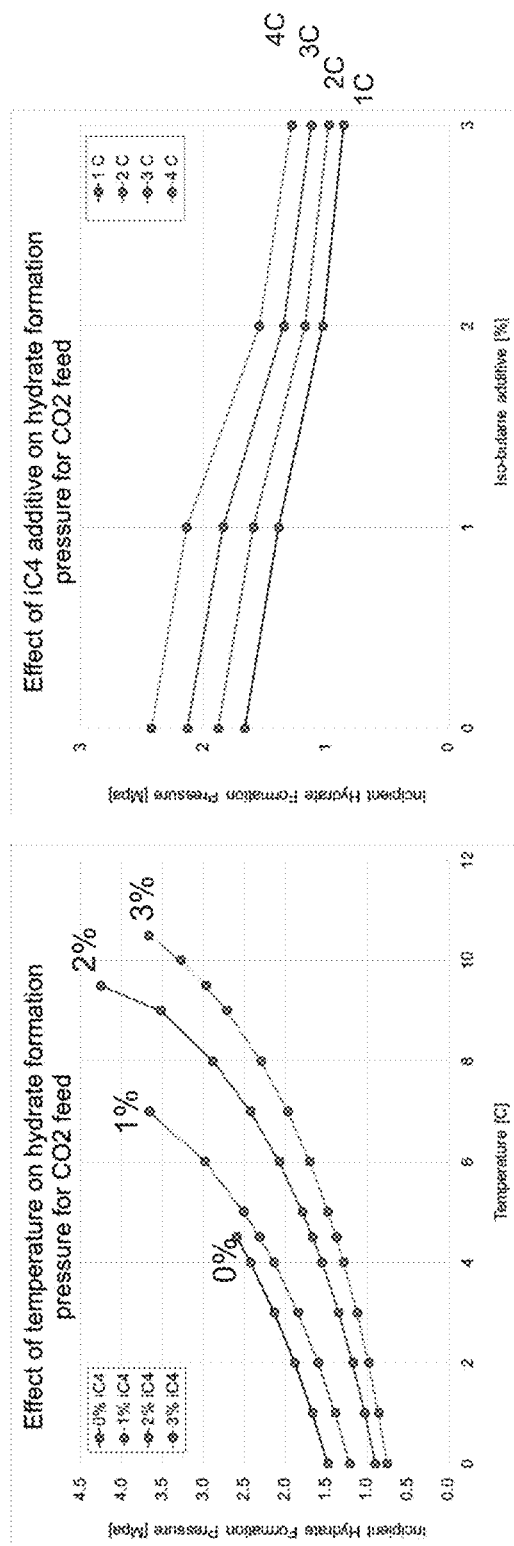
FIG. 6A illustrates the effect of temperature on hydrate formation for $CO_2$ with various concentrations of iso-butane additive.
FIG. 6B illustrates the effect of iso-butane additive on hydrate formation for $CO_2$ feeds at various temperatures.
Figures 7A, 7B:
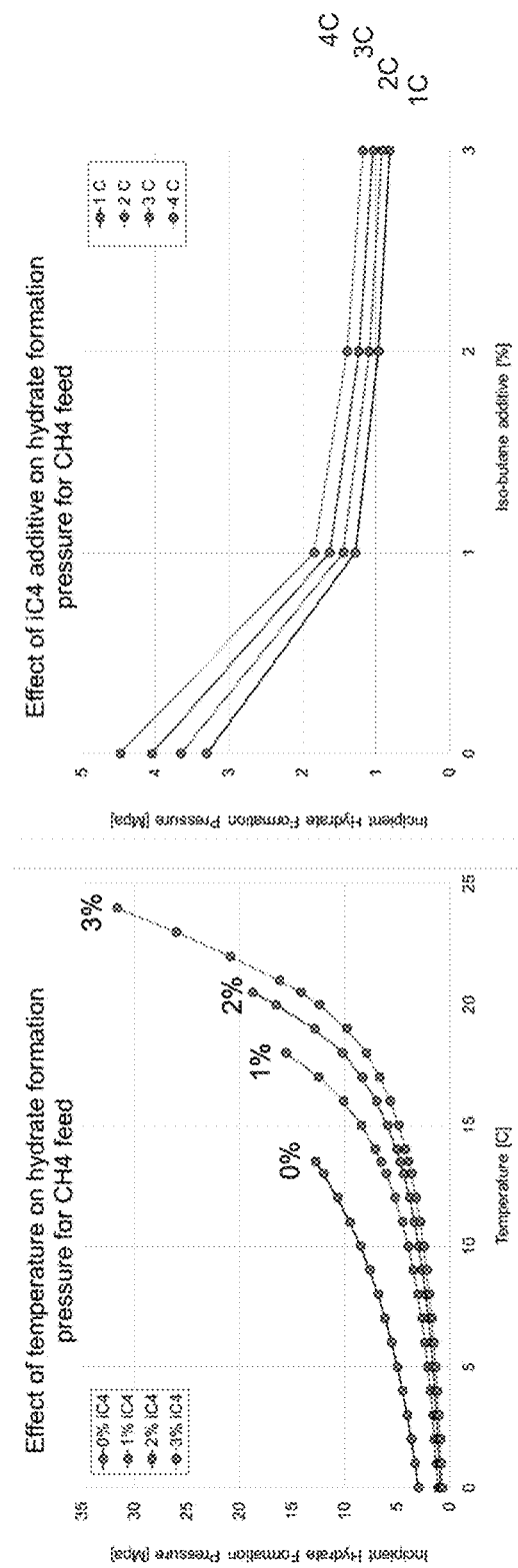
FIG. 7A illustrates the effect of temperature on hydrate formation for $CH_4$ with various concentrations of iso-butane additive.
FIG. 7B illustrates the effect of iso-butane additive on hydrate formation for $CH_4$ feeds at various temperatures.

Apart from GCMC simulations, additional simulations were carried out using hydrate thermodynamics to estimate the minimum temperature for hydrate formation for various molecules. We are able to predict the thermodynamically stable hydrate structures and cage occupancy at given pressure, temperature and composition conditions by minimization of the Gibbs free energy of the specified system. At the given conditions, we calculate the fraction and composition of each phase (e.g., vapor, aqueous, hydrate, ice, liquid hydrocarbon). FIG. 5 shows the comparison of maximum isosteric heat (from GCMC) with the minimum temperature for hydrate formation (from hydrate thermodynamics calculations). These data indicate that maximum isosteric heat is a good descriptor for hydrate formation tendency. For example, $N_2$ is known to be a difficult hydrate former, whereas $H_2S$ is known to be an easy hydrate former; and the GCMC based maximum isosteric heat values conform with this information (i.e., isosteric heat of $H_2S$ is much higher than that of $N_2$). From these results, it is evident that molecules like $H_2S$, Propane, Iso-Butane could act as promising additives for reducing the pressure for hydrate formation, starting from a hydrate former gas (e.g., $CH_4$, $CO_2$, etc.).

Through a large number of GCMC simulations, a number of additives were identified that can decrease the pressure requirement compared to the traditional hydrate former molecules. The following two additional constraints have also been applied. (1) Since the additive gets incorporated in the hydrate structure, it will need downstream separation from water after melting the hydrate. Therefore, highly soluble gas additives and highly miscible liquid additives are eliminated from consideration for desalination. (2) Certain additives that are water-immiscible are also eliminated from consideration based on toxicity. After applying these constraints, it has been determined that iso-butane ($iC_4$) is an excellent additive for decreasing the pressure for hydrate formation, while maintaining ease of downstream separation from water (low solubility in water, relatively non-toxic). This finding is further confirmed via hydrate thermodynamics simulations that show the extent of pressure reduction (or temperature increase) for hydrate formation upon adding various amounts of iso-butane additive. FIGS. 6A, 6B, 7A, 7B, 8A, and 8B show simulation results using three representative feeds —$CO_2$, $CH_4$, and $CH_4/CO_2$ mixture (simulated biogas), respectively. In each case, we show the effect of adding about 1-3 mol % of Iso-Butane additive on hydrate formation pressure. It is possible to use more isobutane (including any value up to 100% isobutane), but too much additive is expensive. In each case, the minimum effective operating pressure decreases as a result of the iso-butane additive. As used herein, the term "minimum effective operating pressure" refers to the pressure below which hydrates do not form in fluids containing hydrate forming constituents during the time the fluids are resident in a vessel or line at a given temperature.

Seawater was approximated as water containing about 0.035 g of NaCl per g of water. It is evident that in all cases, an addition of Iso-Butane results in pressure reduction for hydrate formation. Alternatively, at a given fixed pressure, the hydrate formation (desalination) process can be carried out at a higher temperature. As used herein, "about" is a preposition describing some quantity or parameter value, and indicates that some variation around the stated amount or value is included. Generally, the degree of variation intended to be encompassed is that which would be understood by one of ordinary skill in the art not to materially affect the performance of an apparatus or device or a characteristic of a material or composition described by the amount or parameter. The degree of variation encompassed can be influenced by the ability of an artisan or ordinary skill to measure or control the amount or value in operation of a process or production of a substance or composition. In some instances, variation of up to 10% is envisioned. In some instances variation of up to 5% is envisioned. In some instances variation of up to 1% is envisioned. In some instances, variation of up to 0.5% is envisioned. In some instances, variation of up to 0.1% is envisioned.

While seawater was used in the computer simulations, wastewater can also be used with the present technological advancement. Furthermore, while NaCl was the only dissolved solid considered in the computer simulations, any dissolved salt or combination of dissolved salts in seawater or wastewater can be used in conjunction with the present technological advancement. In general, impurities like metals and salts are excluded from the hydrate structure.

While the computer simulations used $CO_2$, $CH_4$, and a combination thereof, the present technological advancement is useable with any hydrate former gas. $CO_2$ and $CH_4$ were utilized because they are very common in the chemical industry. However, the present technological advancement can use any gas or gas mixture that forms a hydrate can be used for desalination. The economics will depend on the pressure and temperature required to form the hydrate. Hence, additive such as isobutane can be used to lower the pressure or increase the temperature.

Moreover, while the computer simulations used 1-3 mol % of Iso-Butane additive, the trend of the data clearly shows that increasing iso-butane mol % reduces the pressure for hydrate formation. Thus, any values in-between 1-3 mol % are useable with the present technological advancement, as well as any mol % of iso-butane above 3 mol % and up to and including 100 mol % iso-butane (i.e., iso-butane is the entirety of the hydrate former gas), and as well as any mol % of iso-butane above 0 and below 1. However, the extent of the pressure reduction depends on how much iso-butane is used.

Furthermore, given the mol % iso-butane and other inputs, those of ordinary skill in the art can determine the appropriate pressure and temperature combination at which they want to operate equipment at to form the hydrate. This is limited only by the operating criteria of the equipment used. While discrete temperature and pressure data points are shown in the present figures, the present technological advancement is only limited by those pressure and temperature combinations needed to form the hydrate.

Figure 9:
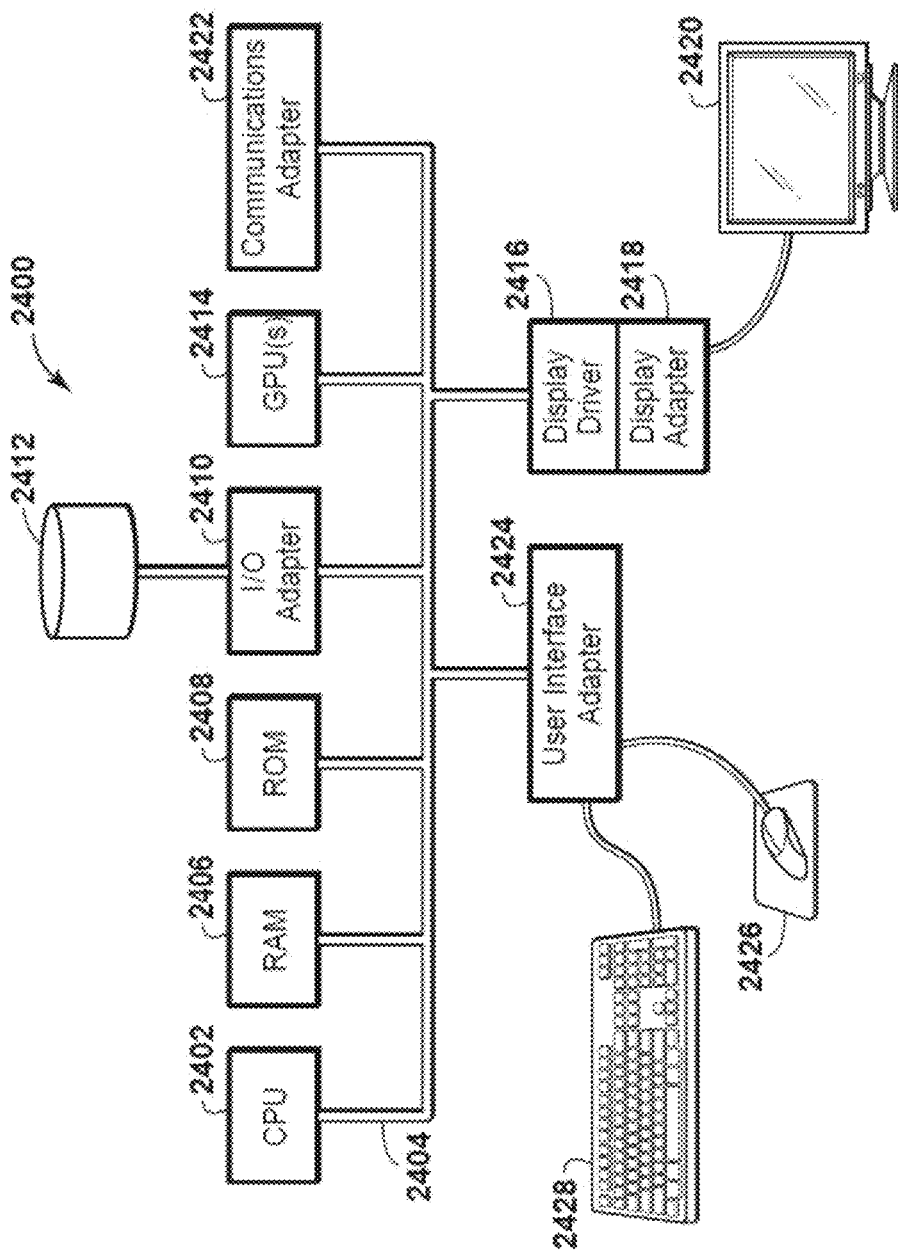
FIG. 9 illustrates a computer system that can execute aspects of the present technological advancement.

FIG. 9 is a block diagram of a computer system 2400 that can be used to execute control the methods and systems discussed herein. A central processing unit (CPU) 2402 is coupled to system bus 2404. The CPU 2402 may be any general-purpose CPU, although other types of architectures of CPU 2402 (or other components of exemplary system 2400) may be used as long as CPU 2402 (and other components of system 2400) supports the operations as described herein. Those of ordinary skill in the art will appreciate that, while only a single CPU 2402 is shown in FIG. 9, additional CPUs may be present. Moreover, the computer system 2400 may comprise a networked, multi-processor computer system that may include a hybrid parallel CPU/GPU system. The CPU 402 may execute the various logical instructions according to various teachings disclosed herein. For example, the CPU 2402 may execute machine-level instructions for performing processing according to the operational flow described.

The computer system 2400 may also include computer components such as nontransitory, computer-readable media. Examples of computer-readable media include a random access memory (RAM) 2406, which may be SRAM, DRAM, SDRAM, or the like. The computer system 2400 may also include additional non-transitory, computer—readable media such as a read-only memory (ROM) 2408, which may be PROM, EPROM, EEPROM, or the like. RAM 2406 and ROM 2408 hold user and system data and programs, as is known in the art. The computer system 2400 may also include an input/output (I/O) adapter 2410, a communications adapter 2422, a user interface adapter 2424, and a display adapter 2418.

The I/O adapter 2410 may connect additional non-transitory, computer—readable media such as a storage device(s) 2412, including, for example, a hard drive, a compact disc (CD) drive, a floppy disk drive, a tape drive, and the like to computer system 2400. The storage device(s) may be used when RAM 2406 is insufficient for the memory requirements associated with storing data for operations of the present techniques. The data storage of the computer system 2400 may be used for storing information and/or other data used or generated as disclosed herein. For example, storage device(s) 2412 may be used to store configuration information or additional plug-ins in accordance with the present techniques. Further, user interface adapter 2424 couples user input devices, such as a keyboard 2428, a pointing device 2426 and/or output devices to the computer system 400. The display adapter 2418 is driven by the CPU 2402 to control the display on a display device 2420 to, for example, present information to the user regarding available plug-ins.

The architecture of system 2400 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the computer system 2400 may include various plug-ins and library files. Input data may additionally include configuration information.

The present techniques may be susceptible to various modifications and alternative forms, and the examples discussed above have been shown only by way of example. However, the present techniques are not intended to be limited to the particular examples disclosed herein. Indeed, the present techniques include all alternatives, modifications, and equivalents falling within the spirit and scope of the appended claims.

The invention claimed is:

1. A system for desalinating a liquid, comprising:
a hydrate former reactor comprising: an inlet configured to receive an aqueous phase; a hydrate slurry outlet configured to discharge the aqueous phase and hydrate from the hydrate former reactor, wherein the inlet and the hydrate slurry outlet are configured to establish a first fluidic pathway; a gas inlet configured to receive a feed gas stream; an excess gas outlet configured to discharge excess gas from the hydrate former reactor, wherein the gas inlet and the excess gas outlet are configured to establish second fluidic pathway and the first fluidic pathway and the second fluidic pathway are in a countercurrent flow; and a plurality of stages, each stage having a selected temperature, wherein the feed gas stream comprises iso-butane in an amount ranging from above zero mol % to about 3 mol %, the aqueous phase comprises liquid seawater or liquid wastewater including a dissolved salt, and the selected temperature in each said stage within the hydrate former reactor is controlled by either refrigeration or heating so that the feed gas stream and the aqueous phase form a hydrate slurry having a plurality of hydrate particles;
a hydrate decomposition unit for decomposing the plurality of hydrate particles into its constituents of water and gas or gas mixture containing iso-butane, the hydrate decomposition unit is in fluidic communication with the hydrate slurry outlet, wherein the water has a concentration of the dissolved salt that is less than that of the liquid seawater or liquid wastewater; and
a vapor-liquid separator wherein the water and gas or gas mixture are separated.

2. The system of claim 1, wherein the hydrate former reactor is a multi-stage reactor further comprising an apparatus configured to mix the feed gas stream and the aqueous phase.

3. The system of claim 1, wherein the hydrate former reactor is a counter current flow reactor.

4. The system of claim 1, wherein the iso-butane recovered by the hydrate decomposition unit is recycled and combined with the feed gas stream.

5. The system of claim 1, wherein the feed gas stream includes $CO_2$, $CH_4$, or a combination thereof.

6. The system of claim 1, wherein the hydrate former reactor includes one or more of a tower, a pipe, a tube, or a tank.

* * * * *